United States Patent [19]

Coleman-Kammula et al.

[11] Patent Number: 5,158,727
[45] Date of Patent: Oct. 27, 1992

[54] POLYOLEFIN/FILLER COMPOSITE MATERIALS AND THEIR PREPARATION AND USE

[75] Inventors: Seetha M. L. Coleman-Kammula; Ian Ross, both of Urmston, United Kingdom

[73] Assignee: Shell Oil Company, Houston, Tex.

[21] Appl. No.: 734,980

[22] Filed: Jul. 24, 1991

[30] Foreign Application Priority Data

Aug. 6, 1990 [GB] United Kingdom ............... 9017203

[51] Int. Cl.$^5$ .............................................. C08J 9/32
[52] U.S. Cl. .................................. 264/109; 264/112; 264/259; 264/DIG. 6; 523/218; 523/219
[58] Field of Search ................ 264/DIG. 6, 112, 109, 264/259, 328.18; 523/218, 219

[56] References Cited

U.S. PATENT DOCUMENTS

| | | | |
|---|---|---|---|
| 4,508,856 | 4/1985 | Smith et al. ........................ | 523/218 |
| 4,608,403 | 8/1986 | Sellstrom ........................... | 523/218 |
| 4,618,525 | 10/1986 | Chamberlain et al. .............. | 428/209 |
| 4,692,480 | 9/1987 | Takahashi et al. .................. | 523/218 |
| 4,788,230 | 11/1988 | Mudge ............................... | 523/219 |
| 4,900,488 | 2/1990 | Collins et al. ...................... | 264/45.7 |
| 5,032,627 | 7/1991 | Wilson et al. ...................... | 523/218 |

FOREIGN PATENT DOCUMENTS

| | | |
|---|---|---|
| 0259373 | 8/1987 | European Pat. Off. . |
| 2445075 | 4/1975 | Fed. Rep. of Germany . |
| 60-133048 | 7/1985 | Japan ................................. 523/218 |

*Primary Examiner*—Mary Lynn Theisen

[57] ABSTRACT

An insulating composition comprises a polyolefin, preferably polypropylene, and hollow microspheres, at least some of which have been pre-treated with a chain-scission agent and, optionally, a functionalizing agent for the polyolefin, before addition to the polyolefin melt. The provision of the chain-scission on the microspheres enables the microspheres to be compounded substantially without breakage with low Melt Flow Index polyolefins, with the result that the resultant composite material can be employed in rigorous application areas, for examples as an extruded flowline insulation.

15 Claims, No Drawings

POLYOLEFIN/FILLER COMPOSITE MATERIALS AND THEIR PREPARATION AND USE

BACKGROUND OF THE INVENTION

1. Field of the Invention

This invention relates to polyolefin/filler composite materials, and their preparation. The invention relates in particular to polyolefin/filler composite materials in which the filler comprises hollow microspheres. Such materials are known as polyolefin "syntactic foams".

2. Description of the Prior Art

The main proposed field of use of the materials of the present invention is thermal insulation, in particular insulation of underwater flowlines. There are onerous requirements on an insulating material for an underwater flowline. Desirably, the material should:

- have a low Melt Flow Index so that it can be extruded in a pipe extrusion process
- be resistant to microsphere breakage during the preparation of the material and subsequent application to a pipe
- permit substantial tensile elongation, to enable a flowline to be installed by any installation method including reel barging
- exhibit low creep over a long period, perhaps a service life of 30 years, during which hot oil may be conveyed within the flowline
- have excellent mechanical properties.

Polyolefin/filler composite materials in which the filler comprises "glass bubbles" are described in Research Disclosure 253015. This article discloses that it is possible to compound "glass bubbles" with inter alia polypropylene using extrusion equipment with less than 5% by weight breakage, to produce low-density composite materials. Proposed uses thereof are extruded parts for buoyancy and thermal insulation and large automotive moldings.

DE 2445075 describes a film coating in which microspheres are coated with a small amount of polymer, then applied to a support and heated. The polymer may comprise a peroxide e.g. 3-10 parts per 100 parts polymer. The use of polypropylene or polybutylenes is not described or proposed.

WO87/0478 relates to a "combined weight- and insulation casing for subsea pipelines". An extrusion technique is employed. Polypropylene and polyvinyl chloride are said to be especially suitable and it is said that these can be foamed by means of a chemical foaming agent or by addition of microspheres of plastic or glass to the melt. However, only chemical foaming is exemplified.

When it was attempted, during experimentation, to incorporate microspheres into a polyolefin to make a composite material suitable for rigorous applications such as flowline insulation, it was found to be impossible to do so adequately on the basis of prior art techniques. It was found that, as indicated in the prior art, it was possible to incorporate microspheres into polypropylene and to extrude the composite material without breakage of the microspheres, but only using base polypropylenes of high Melt Flow Index (MFI), which were of low molecular weight and low viscosity in the melt phase. The resultant composite materials generally had Melt Flow Indexes which were too high for application by the "pipe extrusion" method and/or have unsuitable mechanical properties for flowline insulation. Furthermore, it is known that the creep resistance of materials of high Melt Flow Index is poor. When it was attempted to incorporate microspheres in a base polypropylene of low Melt Flow Index, it was found that a substantial proportion of the microspheres were broken during the compounding or subsequent extrusion, so that the insulation properties were inadequate.

Thus the proposal in the Research Disclosure that "glass bubbles" can be compounded with polypropylene and the resultant composite material extruded would only appear to hold good for what might be termed non-rigorous applications, whilst the unsupported suggestion in WO 87/0478 that microspheres can be employed in extruded pipeline casings appears not to be achievable, at least on the basis of available technology.

The present invention aims to provide a method whereby microspheres may be incorporated in a polyolefin matrix to form a composite material which can be employed in rigorous application areas, for example as an insulating casing for an underwater flowline, and wherein the properties of the composite material may be closely controlled.

SUMMARY OF THE INVENTION

In accordance with the present invention there is provided a method for the preparation of a composite material comprising a polyolefin selected from polypropylene and a polybutylene, and a filler comprising hollow microspheres, the method comprising:

- treating at least some of the microspheres to be incorporated in the polyolefin with a compound which acts as a chain-scission agent for the polyolefin;
- providing an even distribution of said microspheres in said polyolefin in its melt phase, and
- forming the composite material into a desired shape and cooling.

By means of the present invention, accurate control of the Melt Flow Index of the composite material may be achieved. It is found that the method of the present invention enables composite materials to be produced which meet the onerous requirements of use as flowline insulation materials, being of suitable Melt Flow Index for pipeline extrusion, without causing an unacceptable degree of microspheres breakage.

DESCRIPTION OF THE PREFERRED EMBODIMENT

By means of a chain-scission agent, which acts to form free radicals in the polyolefin melt, and which is carried to the polyolefin by the microspheres, accurate control of mechanical properties, for example yield strength, extensibility to break and creep resistance, are obtainable. The composite material may be "tailored" to the requirements of the particular application area by selection of the base polyolefin and/or the type and quantity of the chain-scission agent. Further "tailoring" may be achievable by use of one or more functionalizing agents which act to graft polar functions onto the polymer chain, and thereby enable the polypropylene to "wet" the microspheres. This has the effect of improving yield strength and creep resistance. Examples of suitable functionalizing agents which act to graft polar functions onto the polymer chain are carboxylating agents, for example azidosulphonyl benzoic acid, or preferably, an unsaturated organic acid or anhydride, for example itaconic acid or maleic anhydride. Such a functionalizing agent may suitable be present in an amount of from 0.1 to 5 wt % (on base polyolefin). Preferably a functionalizing agent, when present, is also carried into the polyolefin on the microspheres.

A preferred chain-scission agent for use in the present invention is an azonitrile or, especially, an organic peroxide.

Suitable organic peroxides may include those of the aliphatic hydrocarbon, aromatic hydrocarbon, carboxylic acid ester, ketone, or carbonic acid ester types, and specific examples include diisopropyl peroxide, ditertiary butyl peroxide, tertiary butyl hydroperoxide, dicumyl peroxide, dibenzoyl peroxide, cumyl hydroperoxide, tertiary butyl peracetate, tertiary butyl peroxy laurate, tertiary butyl perbenzoate, ditertiary butyl perphthalate, methylethylketone peroxide, octanol peroxide, and diisopropyl peroxycarbonate. An especially preferred peroxide is DHBP (2,5-dimethyl-2,5-di(tertiary butyl peroxy)hexane or 2,5-dimethyl-2,5-di(tertiary butyl peroxy)hexane-3. Examples of the azonitrile are azobisisopropionitrile and azobisisobutyronitrile.

A chain-scission agent may suitably be present in an amount of from 0.001 to 0.5 wt %, preferably from 0.005 to 0.1 wt %, and most preferably, from 0.01 to 0.06 wt %, based on weight of base olefin. A chain-scission agent is employed to cause a narrowing of the molecular weight distribution of the polyolefin.

The chain-scission agent may be added to the microspheres sample which is to be incorporated in the composite material, and mixed. However, it will be noted from the foregoing paragraph that the quantity of the chain-scission agent may be very small. It will also be appreciated that the volume of the light microspheres may be very large. Even distribution of the chain-scission agent can be difficult to achieve. It has been found to be beneficial for the achievement of good mixing to make a "master mix" of the chain-scission agent and a relatively small volume of microspheres, and to mix this with a relatively large volume, for example at least ten times the volume of uncoated microspheres. The achievement of an even distribution of chain-scission agent throughout the microspheres, by means of this method, is therefore a preferred step in the present invention.

A similar "master mix" method may be employed in relation to a functionalizing agent, as hereinbefore described, when such is employed. To prepare a microsphere sample for compounding, a final "master mix" may first be prepared by mixing together the chain-scission agent "master mix" and the functionalizing agent "master mix". Alternatively, the two "master mixes" may be separately added to uncoated microspheres. Alternatively a chain-scission agent and a functionalizing agent may be mixed, and then used to prepare a "master mix".

Distribution may be aided by diluting the chain-scission reagent (and/or a functionalizing agent, when employed) in a suitable solvent, which solvent is later removed by evaporation. Obviously, a solvent should be selected, which has substantially greater volatility than the chain-scission agent, or the functionalizing agent, when present.

The polypropylene or polybutylene used in this invention may be a homo- or a copolymer. Suitable copolymers are those comprising from 5 to 20 wt % of ethylene as comonomer. The homo- or copolymers may be employed in the form of blends with other polymers, such blends then comprising 1-50 wt %, preferably 10-40 wt % of other polymers such as polyamides and thermoplastic elastomers, e.g. those sold under the registered Trademark KRATON and EPDM rubbers.

Suitably, the Melt Flow Index of base polymers (whether homo-, co- or terpolymers) may be in the range 0.5-60, preferably 2-20, most preferably 3-10 gms/10 min (per ISO 1133).

A preferred polyolefin for use in the present invention is based on polypropylene. A polybutylene material, when employed, is preferably based on butene-1.

The filler may comprise hollow microspheres substantially alone, or in combination with other filler materials, including non-hollow filler materials, for example talc, chalk, barium carbonate or chopped glass fibers. Preferably, however, the filler substantially consists of hollow microspheres (although in interpreting this statement it should be noted that any given sample of microspheres may contain a minor proportion of broken or solid microspheres).

It should also be noted that the term "microspheres", the accepted term of art for the filler materials in question, is not a term of geometrical precision. The majority of the microspheres may or may not be truly spherical.

In accordance with the present invention the microspheres carrying a chain-scission agent may be mixed with the polyolefin in particulate form and the material heated, to melt the polyolefin. Preferably however, the microspheres are added to the polyolefin in its melt phase.

Preferably, the microspheres are present in the composite material in an amount of from 5 to 70%, preferably 30 to 60%, most preferably 40-55% by volume, on volume of the composite material.

Microspheres may be made of various plastics and inorganic material in an amount of from 5 to 70%, preferably 30 to 60%, most preferably 40-55% by volume, on volume of the composite material.

Microspheres may be made of various plastics and inorganic materials. A preferred material is an inorganic glass, preferably a silica-based glass. A particular preferred material may comprise a major proportion of silica and minor proportions of an alkali metal oxide and $B_2O_3$.

The bulk density of the microspheres may suitably be in the range 0.07-06 g/ml, preferably 0.35-0.5 g/ml. The diameter of the microspheres may typically be in the range 10 to 200 $\mu$m, preferably 20 to 130 $\mu$m. The isotactic compressive strength may be in the range 1000-25000 psi, ($6.9 \times 10^6$ PA—$1.03 \times 10^8$ Pa), preferably in the range 5000-15000 psi ($3.4 \times 10^7$ Pa—$1.03 \times 10^8$ Pa).

The method of the invention may comprise subjecting microspheres to a flotation step to assess the quality of a test sample or to improve the quality of the sample of microspheres to be incorporated in the polyolefin.

Preferably, a method in accordance with the present invention produces a composite material having a Melt Flow Index of 0.5-20, preferably 0.5-3, most preferably 1-2. Preferably it has a relative density in the range 0.4-0.85, preferably 0.65-0.75.

The polyolefin desirably contains an antioxidant.

In accordance with another aspect of the present invention there is provided a composite material prepared in accordance with a method as previously described. The material may be provided as tapes or, preferably, pellets, for use in a later injection molding or extrusion process. Alternatively, a sheet of the composite material could be produced, for use in a later compression molding or thermoforming process.

Said material may be suitable for use as flowline insulation composition and further aspects of the invention relate to such a composition, and to a method of forming a flowline insulation layer comprising the steps of extruding composite material as hereinbefore described, onto a steel pipe. If desired the contact between the composite material and the steel pipe may be improved by means of a carboxylated polyolefin layer therebetween. It is possible moreover, because of the excellent mechanical properties and suitable Melt Flow Index which can be achieved in such a composite material, that it may serve as the self-supporting load-bearing wall of a flowline, rather than as an insulating composition on a load-bearing steel pipe.

The composite material can be extruded in the form of tapes and applied to steel pipe by wrapping around a steel pipe, suitably as the pipe rotates. This method is known as "side wrapping". A Preferred Matter to apply the material to a steel pipe is by extruding it in the form of a shell, around a steel pipe. This method is known as "pipe extrusion" because the extrusion of the polymer material is in the shape of a pipe. Pipe extrusion is a difficult, high shear, process requiring a material of low Melt Flow Index; but a desired casing thickness of about 4-60 mm may be achieved in a single step using composite materials of the present invention. A preferred aspect of the present invention therefore relates to a method of preparing an insulated flowline by applying a composite material of the present invention to a steel pipe by a "pipe extrusion" method. If additional layers are required a co-extrusion process may be employed.

A flowline casing may comprise a weighting material, incorporated in the said composite material or provided by a separate casing layer suitably co-extruded with the insulation layer.

A composite material as hereinbefore described may find application in areas other than flowline insulation. For example it could be of use in refrigeration equipment, buoyancy aids, aerospace equipment, or land vehicle applications, where its impact resistance and strength-to-weight ratio may be of greater interest than its thermal insulation property. It should be noted, therefore, that the composite materials of the present invention are not limited to the underwater flowline application area, nor is the method of the present invention limited to the production of materials which would have properties suitable therefor. The method of the present invention enables the production of suitable materials therefor, which materials are of considerable interest, but also enables the production of materials of quite different properties, for different end uses, by permitting precise manipulation of properties to be achieved.

The invention will now be further described, by way of example.

1. GENERAL PROCEDURES

Pre-Treatment of Microspheres with a Peroxide

A master mix of 100 g hollow glass microspheres (for example hollow glass microspheres having a bulk density in the range 0.17-0.49 g/ml and diameters in the range 20-130 μm) was produced by mixing the microspheres, in a 1 liter jar, with 0.3 g of a liquid peroxide, for example DHBP—2,5-dimethyl-2,5-di(tertiary butyl peroxy)hexane—available under the Trademark IN-TEROX DHBP. After stirring for 10 minutes the "master mix" was added to a larger amount (for example 1-3 Kg) of microspheres of the same type in a Henshal mixer, under a nitrogen blanket, and mixed for 10 minutes, until even distribution was achieved.

The microspheres may if desired be subjected to an initial test to assess the proportion of undesirable constituents therein, namely broken microspheres and solid or near-solid microspheres. A simple flotation test may be employed, whereby a test sample is placed in a liquid, conveniently water, and the proportion of particles which sink is assessed against those which float. If the assessment is that there is an undesirably high proportion of non-buoyant particles in the test sample, the same technique may be used on all of the microspheres to be incorporated in the composite material, to remove substantially all non-buoyant particles.

In some embodiments it may be desired to dilute the peroxide in a solvent, which has a substantially greater volatility than the peroxide. The solvent evaporates during the step of mixing the master mix with uncoated microspheres, under reduced pressure if required, or by purging, for example with nitrogen.

In another embodiment a master mix is not prepared. The peroxide is simply mixed with a large volume of microspheres in a Henshal mixer until an even distribution of peroxide is obtained.

Pre-treatment of Microspheres with a Peroxide and Maleic Anhydride

A master mix of peroxide-coated microspheres is prepared, as described above. A separate master mix of microspheres coated with maleic anhydride is prepared, typically in such an amount as to introduce approximately 0.5 wt % maleic anhydride (on weight polyolefin) into the polyolefin. The maleic anhydride may be dissolved in a minimum amount of methanol, subsequently removed by purging with nitrogen. A desired quantity of each said master mix may be mixed together to provide the final master mix which may be mixed with a larger volume of uncoated microspheres.

Compounding

Using a Baker-Perkins twin screw compounding extruder MP 2030, pellets of polypropylene (homo- or copolymer) were fed to the main feed port at a rate of 5 kg/hour. The extrusion temperature was kept at 200° C. and the screw speed was 200 rpm. The treated microspheres were fed into the polypropylene melt using a side feeder at a rate of 2.3 kg/hour, the microspheres constituting about 40-55% by volume of the composite material. The composite material was extruded and pelletized.

| Test Procedures | |
|---|---|
| Melt Flow Index (MFI) | ISO 1133 |
| Density | ISO 1183 |
| Flexural strength | ASTM D790 |
| Flexural strain at yield | ASTM D790 |
| Tensile strength at break | ISO 527 |
| Tensile elongation at break | ISO 527 |
| Tensile strength at yield | ISO 527 |
| Tensile elongation at yield | ISO 527 |
| Water Absorbtion | ASTM C272-53 |
| Thermal conductivity | BS 874 |
| Dimensional stability | ISO 2796 |

EXAMPLES, RESULTS AND DISCUSSION—SET 1

In this set of Examples a polypropylene copolymerized with 10 wt % ethylene (on total polymer weight), and having a Melt Flow Index of 4, was compounded with (A) uncoated microspheres;
(B) microspheres carrying 0.038 wt % DHBP (on wt. microspheres; approximately 0.02 wt % on polymer in the composite material);
(C) microspheres carrying 0.045 wt % DHBP (on wt. microspheres); and
(D) a polypropylene copolymerized during the polymerization reaction with 10 wt % ethylene (on total polymer weight), and having a Melt Flow Index of 19, was compounded with uncoated microspheres.

In each case the microspheres made up 50% by volume of the composite material.

The pellets of the composite materials were injection molded into test pieces for evaluation of their properties.

The results are presented in Table 1, from which it will be seen that compounding uncoated microspheres with the polypropylene of Melt Flow Index 4, result (A), produced a composite material of MFI 0.07. Elongation at break is very high. However, the composite material was discolored and had a density of 0.85 g/ml. "Ashing" of the composite material—placing it in an oven at 550° C. to fully remove the polypropylene to leave the filler—enabled the filler to be analyzed, by the flotation method as described above and by electron microscopy. This confirmed that a high proportion of microspheres had been broken. In conclusion, the low flow of the polypropylene melt is detrimental to the microspheres and the product is unsuitable for use as a flowline insulation material.

Compounding uncoated microspheres with polypropylene of Melt Flow Index 19, result (D), enabled microspheres to be incorporated without breakage, producing a composite material with a density of 0.7 g/ml. However, the MFI, at 3.5, is too high for pipe extrusion. Moreover, the elongation to break is reduced to 8% due to the reduced molecular weight of the base polymer.

It will be seen from Table 1 that application of very small quanties of the peroxide to the microspheres, results (B) and (C), enabled the microspheres to be compounded with polypropylene with the relatively low Melt Flow Index of 4 and produced composite material suitable as a flowline insulation material. The density of the materials produced was 0.7 g/ml, indicating little microsphere breakage. This was further confirmed by "ashing" followed by flotation and electron microscopy analysis. Tensile strength and flexural properties were maintained and tensile elongation at break was good, particularly for the example using the lower amount of peroxide. They were the only materials with a suitable balance of properties for use as a flowline insulation material and application by pipe extrusion.

TABLE 1

| Compounded Material | MFI (g/10 min) | Dens. (g/ml) | TENSILE Yield Stress MPa | TENSILE Strain at Yield % | TENSILE Strength at break MPa | TENSILE Strain at break % | FLEXURAL Strength MPa | FLEXURAL Strain at Yield % |
|---|---|---|---|---|---|---|---|---|
| A) PPco (MFI 4) + 50v% ms | 0.07 | 0.85 | 10.2 | 3.7 | 9.8 | 32 | 18.2 | 2.8 |
| B) PPco (MFI 4) + 50v% ms + 0.038 perox.) | 1.5 | 0.7 | 10.8 | 0.74 | 9.0 | 25.7 | 17.8 | 2.1 |
| C) PPco (MFI 4) + (50v% ms + 0.045% perox.) | 1.7 | 0.7 | 11.1 | 0.72 | 9.3 | 13.0 | 19.0 | 3.4 |
| D) PPco (MFI 19) + 50v% ms | 3.5 | 0.7 | 9.8 | 0.50 | 8.4 | 8.4 | 17.4 | 2.3 |

Materials in accordance with the invention, as described above, have been tested in respect of their thermal conductivity, water absorption, and dimensional stability at 70° C. The results are as follows:

| | |
|---|---|
| Thermal conductivity | 0.14 W/mK |
| Water absorption | 0.06% |
| Dimensional stability (70° C.) | 0.2% |

The results further confirm the suitability of these materials as flowline insulation materials.

EXAMPLES, RESULTS AND DISCUSSION—SET 2

A polypropylene homopolymer of Melt Flow Index 11 was compounded with a) uncoated microspheres of density 0.38 g/cc and
b) such microspheres carrying peroxide (0.02 wt % on polypropylene) and maleic anhydride (MALA—0.5 wt % on polypropylene)

The results are shown in Table 2.

TABLE 2

| Property | PP + ms | PP + (ms + Peroxide + MALA) |
|---|---|---|
| MFI (g/10 min) | 1.5 | 1.7 |
| Microsphere content (wt % on composite material) | 29.5 | 28.6 |
| Density (g/ml) | 0.706 | 0.685 |
| Tensile strength at yield (%) | 10.4 | 16.0 |
| Elongation at yield (%) | 3 | 0.7 |
| Tensile strength at break (MPa) | 10.0 | 16.1 |
| Elongation at break (%) | 70 | 3 |

It will be observed from Table 2 that the use of a small amount of peroxide and maleic anhydride causes substantial changes in the properties of the composite material. Tensile strength is substantially enhanced whilst a Melt Flow Index suitable for pipe extrusion is maintained. Adhesion between microspheres and polymers is believed to be improved thereby increasing creep resistance. The maleic anhydride is thought to improve the adhesion between the microspheres and the polymer by introduction of carboxyl groups on the latter. The material is suitable for many uses, including flowline insulation when the flowline is to be installed by a method causing less strain on the flowline than reel barging. The properties could be modified by adjustment of the concentrations of the peroxide and/or the maleic anhydride. Reduction of the amount of maleic anhydride would be expected to cause an increase in the elongation to break of the composite material and so enable a composite material suitable for installation by reel barging to be produced.

Many other variations and modifications may be made in the apparatus and techniques hereinbefore described, both by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

We claim:

1. A method for the preparation of a composite material comprising a polyolefin selected from polypropylene and a polybutylene, and a filler comprising hollow microspheres, the method comprising;
   treating at least some of the microspheres to be incorporated in the polyolefin with a reagent which acts as a chain-scission agent for the polyolefin;
   providing an even distribution of said microspheres in said polyolefin in its melt phase; and
   forming the composite material into a desired shape, and
   cooling the composite material.

2. The method of claim 1 further including the step of selecting the microspheres to be made from inorganic glass.

3. The method of clsaim 1 further including the step of selecting the reagent to be an organic peroxide.

4. The method of claim 3 wherein the amount of organic peroxide selected is present in an amount of 0.001 to 0.5 wt % based on weight polyolefin.

5. The method of claim 1 wherein the step of treating at least some of the microspheres to be incorporated in the polyolefin with said chain-scission agent is done by
   preparing a sample of microspheres by treatment thereof with a chain-scission agent, such that the concentration of chain-scission agent on the microspheres is higher than is required for compounding, and
   diluting the treated sample or a portion thereof with microspheres which have not been treated with the chain-scission agent.

6. The method of claim 5 wherein the chain-scission agent used to treat the microspheres has been diluted in a solvent.

7. The method of claim 1 wherein the step of treating at least some of the microspheres to be incorporated into the polyolefin is done by treating at least some of said microspheres with a functionalizing reagent which acts to graft polar groups onto the polyolefin.

8. The method of claim 7 wherein the functionalizing reagent is selected from the group consisting of azidosulphonylbenzoic acid, unsaturated organic acid, and anhydride.

9. The method of claim 7 wherein the step of treating at least some of the microspheres to be incorporated in the polyolefin with a functionalizing reagent is done by
   preparing a sample of microspheres by treatment thereof with a functionalizing agent, such that the concentration of functionalizing agent on the microspheres is higher than is required for compounding, and
   diluting the treated sample or a portion thereof with microspheres which have not been treated with the functionalizing reagent.

10. The method of claim 1 further including the preliminary step of immersing microspheres in a liquid in which desirable microspheres float, as an assessment of quality thereof, or as a method of improving the quality of the sample.

11. The method of claim 1 wherein the composite material produced has a Melt Flow Index in the range 0.5–5 g/10 min.

12. The method of claim 1 wherein the density of the composite material is selected to be in the range of from 0.65 to about 0.75 g/ml.

13. The method of claim 1 wherein the composite material is selected to contain 30–60%, by volume, of microspheres.

14. The method of claim 1 wherein the step of forming the composite material into a desired shape is done by extruding the composite material onto a steel pipe so as to form an insulating layer thereon.

15. The method of claim 1 wherein the step of forming the composite material into a desired shape is done by injection molding the composite material about the exterior of a steel pipe so as to form an insulating layer thereon.

* * * * *